United States Patent
Shim et al.

(10) Patent No.: US 12,256,170 B2
(45) Date of Patent: Mar. 18, 2025

(54) METHOD OF TRANSMITTING IMAGE DATA HAVING HYBRID RESOLUTION AND METHOD OF GENERATING HYBRID-RESOLUTION IMAGE USING THE SAME

(71) Applicant: KOREA INSTITUTE OF SCIENCE AND TECHNOLOGY, Seoul (KR)

(72) Inventors: Jae Wan Shim, Seoul (KR); Heon Phil Ha, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 250 days.

(21) Appl. No.: 17/377,837

(22) Filed: Jul. 16, 2021

(65) Prior Publication Data

US 2022/0021840 A1  Jan. 20, 2022

(30) Foreign Application Priority Data

Jul. 16, 2020  (KR) ........................ 10-2020-0087883

(51) Int. Cl.
*H04N 7/015*  (2006.01)
*G06T 3/60*  (2024.01)
*G06T 5/70*  (2024.01)
*G06V 40/16*  (2022.01)

(52) U.S. Cl.
CPC ............... *H04N 7/015* (2013.01); *G06T 3/60* (2013.01); *G06T 5/70* (2024.01); *G06V 40/161* (2022.01)

(58) Field of Classification Search
CPC .... H04N 7/015; H04N 19/132; H04N 19/156; H04N 19/162; H04N 19/164; H04N 19/167; H04N 19/17; H04N 19/426; H04N 19/85; H04N 21/23418; H04N 21/234363; H04N 21/2402; H04N 21/25833; H04N 21/4728; H04N 21/234345; H04N 7/0117; H04N 5/2628; G06T 3/60; G06T 5/002; G06T 7/194; G06V 40/161

See application file for complete search history.

(56) References Cited

U.S. PATENT DOCUMENTS

| | | | | |
|---|---|---|---|---|
| 5,657,430 | A * | 8/1997 | Smith ................... | G06K 15/02 358/1.8 |
| 7,313,593 | B1 * | 12/2007 | Pulito .................... | G06Q 10/10 709/227 |
| 8,948,245 | B2 * | 2/2015 | Henson ................ | G06V 10/993 375/240.01 |
| 10,250,888 | B2 * | 4/2019 | Jeong ................... | H04N 19/164 |
| 2015/0052200 | A1 * | 2/2015 | Ouyang ................ | H04L 65/401 709/204 |

(Continued)

FOREIGN PATENT DOCUMENTS

| JP | 2017055355 A | | 3/2017 |
|---|---|---|---|
| JP | 2018212978 | * | 2/2018 |

(Continued)

*Primary Examiner* — Helen Zong
(74) *Attorney, Agent, or Firm* — Rabin & Berdo, P.C.

(57) ABSTRACT

Disclosed are a method of transmitting image data having a hybrid resolution and a method of generating a hybrid-resolution image. A main region of an original image is transmitted as a high-resolution image and the remaining regions are transmitted as a low-resolution background image. Accordingly, an amount of data to be transmitted is able to be reduced.

29 Claims, 9 Drawing Sheets

(56) References Cited

U.S. PATENT DOCUMENTS

| | | | | |
|---|---|---|---|---|
| 2015/0195491 | A1* | 7/2015 | Shaburov | H04N 7/147 |
| | | | | 348/14.12 |
| 2017/0085728 | A1* | 3/2017 | Miyakawa | H04L 67/142 |
| 2018/0268822 | A1* | 9/2018 | Mano | G10L 25/27 |
| 2020/0127808 | A1* | 4/2020 | Takahashi | H04N 21/4302 |
| 2021/0090521 | A1* | 3/2021 | Lee | G09G 5/02 |
| 2021/0097732 | A1* | 4/2021 | Yamamoto | G06T 11/00 |
| 2022/0121734 | A1* | 4/2022 | Nakamura | A61B 5/1171 |
| 2022/0207294 | A1* | 6/2022 | Kim | G06V 10/751 |
| 2022/0256099 | A1* | 8/2022 | Feng | H04N 21/4728 |
| 2023/0019794 | A1* | 1/2023 | Saville | G06F 16/532 |
| 2023/0048147 | A1* | 2/2023 | Cai | G06V 40/161 |
| 2023/0290082 | A1* | 9/2023 | Amberg | G06T 7/246 |
| | | | | 345/419 |

FOREIGN PATENT DOCUMENTS

| | | | |
|---|---|---|---|
| JP | 2020080479 | A | 5/2020 |
| KR | 1020120019662 | A | 3/2012 |
| KR | 1020170128498 | A | 11/2017 |
| KR | 1020190135340 | A | 12/2019 |

\* cited by examiner

METHOD OF TRANSMITTING IMAGE DATA HAVING HYBRID RESOLUTION AND METHOD OF GENERATING HYBRID-RESOLUTION IMAGE USING THE SAME

CROSS-REFERENCE TO RELATED APPLICATION

This application claims priority to and the benefit of Korean Patent Application No. 2020-0087883, filed on Jul. 16, 2020, the disclosure of which is incorporated herein by reference in its entirety.

BACKGROUND

1. Field of the Invention

The present invention relates to image data transmission and image generation, and more specifically, to real-time image data transmission and real-time image generation.

2. Discussion of Related Art

Recently, with the development of Internet communication technology, streaming services for transmitting video data in real time are being provided. As a representative video streaming service, there are video on demand (VOD) services, and recently, contact-free video conference services have also increased.

Video conference systems are configured in such a way that a terminal at one side, in which a camera is installed, transmits video data and a terminal having a display at another side generates the video data as a video and displays the video on the display. In this case, the quality of a screen and audio is determined by hardware performance of both side terminals and, above all, is further determined by a bandwidth of a network for transmitting and receiving video data.

When high-quality video data having a bandwidth greater than that of a network is transmitted by streaming, some pieces of the video data are lost or omitted and the reception-side video is broken or interrupted. On the other hand, when low-quality video data is transmitted by streaming in consideration of the bandwidth of the network, the possibility of loss or omission of video data is low, but a problem in that the quality of the video conference itself is degraded due to the low quality of the video reproduced at the reception side occurs.

In order to compensate for the above problem, a method of automatically increasing or decreasing a resolution according to a communication status of a network has been proposed, but user inconvenience occurs due to a change in screen between a high resolution and a low resolution alternately, and since there is a limitation that the resolution cannot be lowered below a certain level even in consideration of the communication status of the network, the video data may be interrupted even in automatically increasing or decreasing a resolution setting.

DOCUMENT OF RELATED ART

Patent Document

Korean Patent Application Publication No. 10-2019-0135340, Published on Dec. 6, 2019

SUMMARY OF THE INVENTION

The present invention is directed to providing a method of transmitting hybrid-resolution image data in which a data amount for transmission is reduced and a method of generating a hybrid-resolution image in which a high-quality image is generated with a small amount of data.

Objects of the present invention are not limited to the above-described objects and other objects which have not been described may be clearly understood by those skilled in the art from the above descriptions.

According to an aspect of the present invention, there is provided a method of transmitting hybrid-resolution image data, which includes an operation (a) of receiving, by a processor, data of an original image from an image information generating device, an operation (b) of setting, by the processor, at least one first-resolution display region (hereinafter, referred to as a "high-resolution display region") in the original image, an operation (c) of converting, by the processor, the high-resolution display region in the original image into image data (hereinafter, referred to as "high-resolution image data") having a first resolution, an operation (d) of converting, by the processor, the data of the original image into background image data at a second resolution lower than the first resolution, and an operation (e) of transmitting, by the processor, the high-resolution image data or the background image data.

The operation (b) may include setting a region set by a user input or an external terminal as the high-resolution display region.

The operation (b) may include setting, by the processor, a face region in the original image as the high-resolution display region using a face recognition algorithm.

The operation (b) may include further setting, by the processor, a buffer region having a preset size from a boundary of the high-resolution display region.

The operation (c) may include changing, by the processor, the buffer region to a buffer region having the first resolution and further adding a blur effect to the changed buffer region.

The operation (e) may include further transmitting, by the processor, location information of the high-resolution display region.

The operation (d) may include filling, by the processor, image data in the background image data, which corresponds to the high-resolution display region, with preset display data and converting the image data, and the operation (e) may include transmitting, by the processor, the background image data and the high-resolution image data.

The operation (e) may include an operation (e-1) of determining, by the processor, whether the background image data to be transmitted is identical to background image data that is previously transmitted, and an operation (e-2) of, when it is determined that the background image data that is previously transmitted is identical to the background image data to be transmitted, transmitting, by the processor, only the high-resolution image data.

The operation (e-2) may include further transmitting, by the processor, the location information of the high-resolution display region.

The method of transmitting hybrid-resolution image data may further include an operation (f) of, when a network delay phenomenon occurs, reducing, by the processor, the high-resolution display region or converting the high-resolution display region into a high-resolution display region having the second resolution.

When an interval between acknowledge signals to be received in each preset period is longer than the set period, the processor may determine that the network delay phenomenon occurs.

The method of transmitting the hybrid-resolution image data according to the present invention may be implemented in the form of a computer program which is written in a computer to perform each operation of the method and recorded on a computer-readable recording medium.

According to still another aspect of the present invention, there is provided a method of generating a hybrid-resolution image, which includes an operation (a) of receiving, by a processor, image data (hereinafter, referred to as "high-resolution image data") having a first resolution or background image data having a second resolution lower than the first resolution, an operation (b) of generating, by the processor, a background image having the first resolution using the background image data, an operation (c) of generating, by the processor, a high-resolution image having the first resolution using the high-resolution image data, and an operation (d) of generating, by the processor, a hybrid image by superimposing the high-resolution image on the background image.

The operation (b) may include generating the background image by repeatedly using data for each of pixels included in the background image data to correspond to the number of pixels corresponding to the first resolution.

The operation (c) may include setting, by the processor, a buffer region having a preset size from a boundary of a high-resolution display region.

The operation (c) may include adding, by the processor, a blur effect to the buffer region.

The operation (a) may include further receiving, by the processor, location information of a high-resolution display region, which is information about a location in which the high-resolution image is superimposed on the background image.

In the background image data received in the operation (a), image data corresponding to a high-resolution display region, which corresponds to a location of the background image data in which the high-resolution image is superimposed on the background image, may be filled with preset display data.

The operation (d) may include generating, by the processor, the hybrid image by superimposing the high-resolution image at the location of the background image data filled with the preset display data.

The operation (a) may include receiving only the high-resolution image data and the operation (b) may include replacing the background image with a background image generated using background image data previously received.

The operation (b) may include an operation (b-1) of determining, by the processor, whether the background image data currently received is identical to background image data that is previously received, and an operation (b-2) of, when it is determined that background image data that is previously transmitted is identical to background image data to be transmitted, replacing, by the processor, the background image with a background image generated using the background image data previously received.

The method of generating the hybrid-resolution image may further include an operation (e) of transmitting, by the processor, an acknowledge signal to a device to which the image data is transmitted in each preset period.

The method of generating the hybrid-resolution image according to the present invention may be implemented in the form of a computer program which is written in a computer to perform each operation of the method and recorded on a computer-readable recording medium.

According to yet another aspect of the present invention, there is provided a hybrid-resolution image transmission device including an image information generating device configured to output data of an original image, a processor configured to generate background image data or high-resolution image data using the data of the original image, and a communication unit configured to transmit the background image data or the high-resolution image data. In this case, the processor may receive the data of the original image from the image information generating device, set at least one first-resolution display region (hereinafter, referred to as a "high-resolution display region") in the original image, convert the data of the original image into background image data at a second resolution lower than a first resolution, convert the high-resolution display region in the original image into image data (hereinafter, referred to as "high-resolution image data") having the first resolution, and control the communication unit to transmit the background image data or the high-resolution image data.

According to yet another aspect of the present invention, there is provided a hybrid-resolution image generating device including a communication unit configured to receive image data (hereinafter, referred to as "high-resolution image data") having a first resolution or background image data having a second resolution lower than the first resolution, a processor configured to generate a hybrid image using the high-resolution image data and the background image data, and a display configured to output the hybrid image. In this case, the processor may receive the high-resolution image data or the background image data from the communication unit, generate a background image using the background image data, generate a high-resolution image using the high-resolution image data, and generate a hybrid image by superimposing the high-resolution image on the background image.

Other specific details of the present invention are included in detailed descriptions and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 3A, 3B, 3C, 3C-1, and 3D illustrate reference diagrams of image data processed according to an embodiment of the present invention;

FIGS. 5A, 5A-1, 5B, 5C, and 5D illustrate reference diagrams of image data processed according to an embodiment of the present invention.

DETAILED DESCRIPTION OF EXEMPLARY EMBODIMENTS

Figure 1:
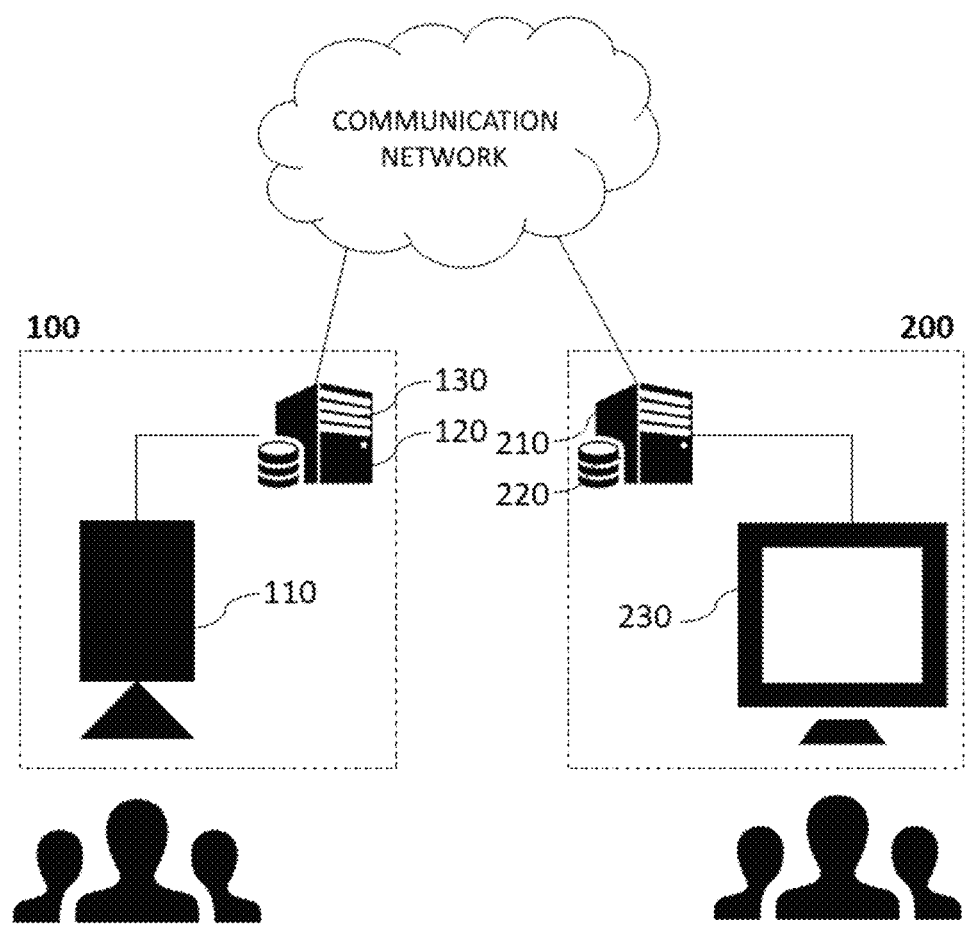
FIG. 1 is a schematic configuration diagram of a video conference system.

Advantages and features of the present invention and methods of achieving the same will be clearly understood with reference to the accompanying drawings and embodiments described in detail below. However, the present invention is not limited to the embodiments to be disclosed below but may be implemented in various different forms. The embodiments are provided in order to fully describe the present embodiments and fully explain the scope of the present invention for those skilled in the art. The scope of the present invention is only defined by the appended claims.

Terms used in this specification are considered in a descriptive sense only and not for purposes of limitation. In this specification, singular forms include plural forms unless the context clearly indicates otherwise. It will be understood that terms "comprise" and/or "comprising," when used herein, specify some stated components but do not preclude the presence or addition of one or more other components.

Like reference numerals indicate like components throughout the specification and the term "and/or" includes each and all combinations of one or more referents. It should be understood that, although the terms "first," "second," etc. may be used herein to describe various components, these components are not limited by these terms. The terms are only used to distinguish one component from another component. Therefore, it should be understood that a first component to be described below may be a second component within the technical scope of the present invention.

Unless otherwise defined, all terms (including technical and scientific terms) used herein can be used as is customary in the art to which the present invention belongs. Also, it will be further understood that terms, such as those defined in commonly used dictionaries, will not be interpreted in an idealized or overly formal sense unless expressly so defined herein. Hereinafter, the embodiments of the present invention will be described in detail with reference to the accompanying drawings.

FIG. 1 is a schematic configuration diagram of a video conference system.

Referring to FIG. 1, the video conference system may include both terminals (computers, tablet personal computers (PCs), smartphones, etc.), which are connected through a communication network (Internet). When image data (including a screen and audio) captured by a camera on one side is transmitted to the other side through the communication network, the image is reproduced on the reception side. In FIG. 1, although a case in which a camera is present only on one side and only a display is present on the other side is briefly illustrated, a general video conference system may include both of a camera and a display on both sides in two directions.

A hybrid-resolution image data transmission device 100 according to the present invention may include a camera 110 configured to output original image data, a processor 120 configured to generate background image data or high-resolution image data using the original image data, and a communication unit 130 configured to transmit the background image data or the high-resolution image data.

A hybrid-resolution image generating device 200 according to the present invention may include a communication unit 210 configured to receive image data (hereinafter, referred to as "high-resolution image data") having a first resolution or background image data having a second resolution lower than the first resolution, a processor 220 configured to generate a hybrid image using the high-resolution image data and the background image data, and a display 230 configured to output the hybrid image.

The communication unit 130 included in the hybrid-resolution image data transmission device 100 and the communication unit 210 included in the hybrid-resolution image generating device 200 are components that allow a terminal to transmit or receive data to or from another terminal through a wired and/or wireless communication network, and the communication units 130 and 210 may be identical to each other. Further, the processor 120 included in the hybrid-resolution image data transmission device 100 and the processor 220 included in the hybrid-resolution image generating device 200 may process an algorithm, which will be described in detail below, in the same manner. That is, in FIG. 1, for simplification of the drawing and convenience of understanding, although the data is illustrated as being transmitted on one side and as being received on the other side, the data may be transmitted and received in two directions and, accordingly, the processors 120 and 220 may have the same data processing algorithm.

Hereinafter, a method of transmitting hybrid-resolution image data and a method of generating a hybrid-resolution image according to the present invention will be described. However, for convenience of understanding and prevention of confusion, the processor 120 that performs the method of transmitting the hybrid-resolution image data according to the present invention is referred to as a "transmission-side processor 120," and the processor 220 that performs the method of generating the hybrid-resolution image according to the present invention is referred to as a "reception-side processor 220."

Figure 2:
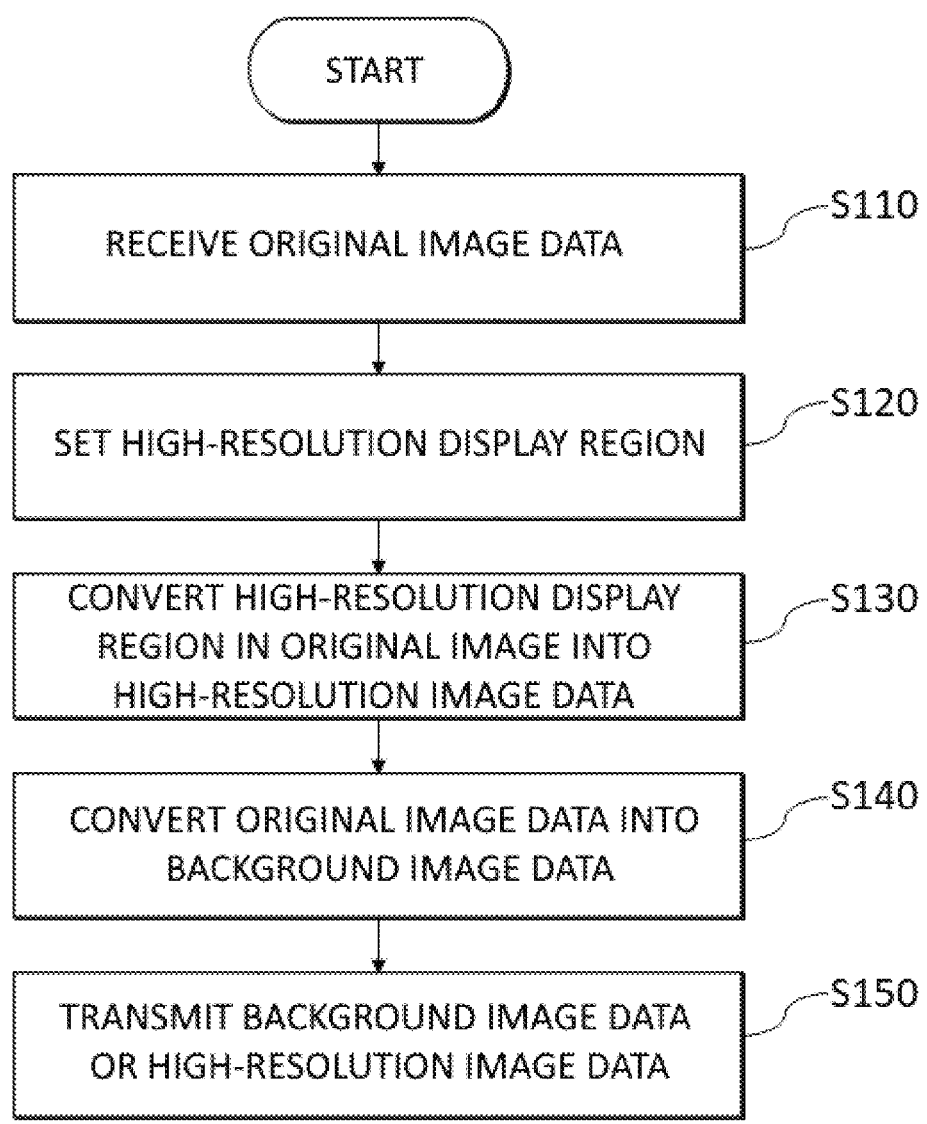
FIG. 2 is a flowchart of a method of transmitting hybrid-resolution image data according to an embodiment of the present invention.

FIG. 2 is a flowchart of a method of transmitting hybrid-resolution image data according to an embodiment of the present invention.

FIG. 3 illustrates reference diagrams of image data processed according to an embodiment of the present invention.

Referring to FIG. 2, first, in operation S110, the transmission-side processor 120 may receive original image data from the camera 110. In this specification, the original image data is data for an image captured by the camera 110 and refers to an image according to a resolution of the camera. The transmission-side processor 120 may directly receive the original image data from the camera 110 or may indirectly receive the original image data after passing through a memory device, an image processing device, or the like.

Figure 3A:
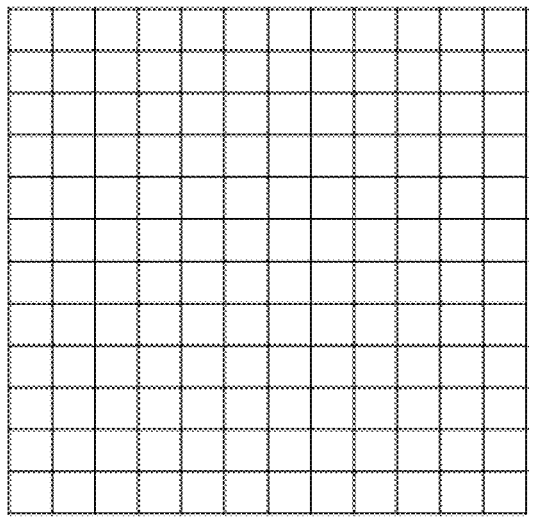

FIG. 3A is a reference diagram of the original image data. In FIG. 3A, for convenience of understanding, the original image data is illustrated as an image having a resolution of 12×12, but the present invention is not limited to the above example.

Referring to FIG. 2 again, next, in operation S120, the transmission-side processor 120 may set at least one first-resolution display region (hereinafter, referred to as a "high-resolution display region") in the original image. The high-resolution display region may be an important portion in the original image. For example, in the case of a video conference, a face region of a participant participating in the video conference may become the high-resolution display region. Further, when a product is photographed in the middle of the conference, a product region located in the center of the image may become the high-resolution display region.

According to an embodiment of the present invention, in operation S120, a region set by a user input or an external terminal may be set as the high-resolution display region. For the user input, the transmission-side terminal may include an input device capable of receiving the user input. Further, the external terminal may be a reception-side terminal according to the present invention and may transmit or receive related data through the communication units 130 and 210. For example, when there are a plurality of video conference participants, the high-resolution display region may be set as a screen on which one participant's own image appears or may be set as a screen on which another participant's image appears. For the other party, the high-resolution display region may also be set in the same way as above. Therefore, the settings of the high-resolution display region may conflict with each other. In this case, the priority may be given to a person receiving video data so that there is no conflict. Further, in the case in which a data transmission speed depends on a communication status of a network through which data is transmitted or received, it is determined by checking the communication status of the network and/or checking whether the computational processing capability of the terminal (computer, etc.) that transmits and receives the image is sufficient. When it is determined that there is sufficient capacity to transmit or receive a portion other than the high-resolution display region selected by the user at a high resolution, the high-resolution region may be automatically enlarged and when it is determined that there is insufficient capacity, the high-resolution region may be automatically reduced up to the region selected by the user.

According to another embodiment of the present invention, in operation S120, the transmission-side processor 120 may set a face region in the original image as the high-resolution display region using a face recognition algorithm.

Figure 3B:
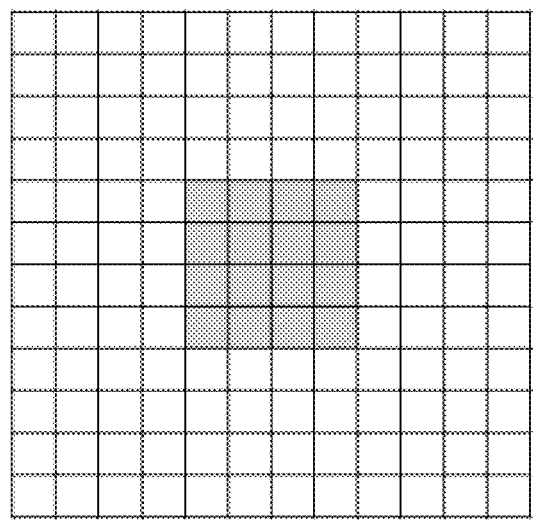

FIG. 3B is a reference diagram illustrating the high-resolution display region set in the original image. In FIG. 3B, a central 4×4 region, which is shaded, is the high-resolution display region. Meanwhile, in FIG. 3, although the high-resolution display region is illustrated as one region, the transmission-side processor 120 may set a plurality of high-resolution display regions (e.g., when there are a plurality of video conference participants).

Referring to FIG. 2 again, next, in operation S130, the transmission-side processor 120 may convert the high-resolution display region in the original image into image data (hereinafter, referred to as "high-resolution image data") having a first resolution. The first resolution may be variously set according to a user selection value, a status of a communication network, a fixed difference value from a second resolution, and the like.

Figure 3C:
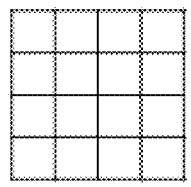
Figures 1, 3C:
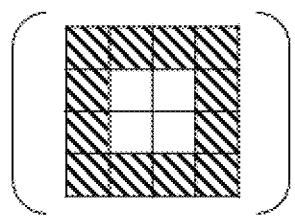

FIG. 3C is a reference diagram illustrating the high-resolution display region converted into high-resolution image data having the first resolution. In FIG. 3C, for convenience of understanding, although the resolution of the high-resolution image data is illustrated as the same as the resolution of the original image, the present invention is not limited to the above example, and the first resolution may be lower than the resolution of the original image.

Referring to FIG. 2 again, next, in operation S140, the transmission-side processor 120 may convert the original image data into background image data having the second resolution lower than the first resolution. The second resolution may be variously set according to the user selection value, the status of the communication network, a fixed difference value from the first resolution, and the like.

Figure 3D:
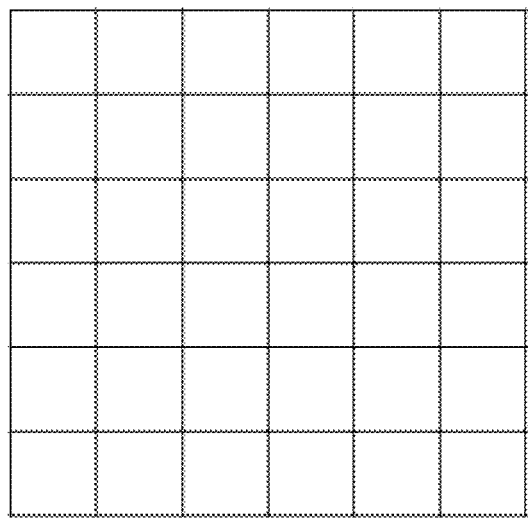

FIG. 3D is a reference diagram illustrating the original image being converted into a background image having the second resolution. In FIG. 3D, for convenience of understanding, although the background image is illustrated as an image having a resolution of 6×6, the present invention is not limited to the above example.

Meanwhile, in this specification, although the operation S140 is illustrated as being performed after the operation S130 is performed, the operation S140 is first performed and then the operation S130 may be performed, or the operation S130 and the operation S140 may be simultaneously performed.

Referring to FIG. 2 again, next, in operation S150, the transmission-side processor 120 may transmit the high-resolution image data or the background image data. The high-resolution image data or the background image data is transmitted to the hybrid-resolution image generating device 200, that is, a reception-side terminal, through the communication network. Meanwhile, in this specification, the "transmission" does not necessarily mean only the transmission of data through the network. Transmitting data by the processor, for example, transmitting data from a cache memory to a dynamic random access memory (DRAM), may correspond to the transmission, and transmitting data from any one program to another program may also correspond to the transmission. Therefore, the processor 120 may perform an operation of storing the data in the memory so that the data is used in, for example, a video conference program.

Meanwhile, in FIGS. 1 and 2, although a process of receiving the original image data by directly using the camera 110 and then generating the hybrid-resolution image data is described, the method of transmitting the hybrid-resolution image data according to the present invention is not necessarily limited to the case where the camera 110 is directly used. In a general video conference program, image data generated by a device such as the camera 110 is transmitted to the other party. Meanwhile, there is a computer program called a virtual webcam. The above computer program is software that behaves like a physically existing camera. In the method of transmitting the hybrid-resolution image data according to the present invention, the original image data may be received through the camera 110 or may be received through a virtual webcam. Further, in the method of transmitting the hybrid-resolution image data according to the present invention, the high-resolution image data or the background image data may be output in the form of the virtual webcam. Therefore, the camera 110 according to the present invention corresponds to an example of an image information generating device.

Hereinafter, the method of generating the hybrid-resolution image will be described.

Figure 4:
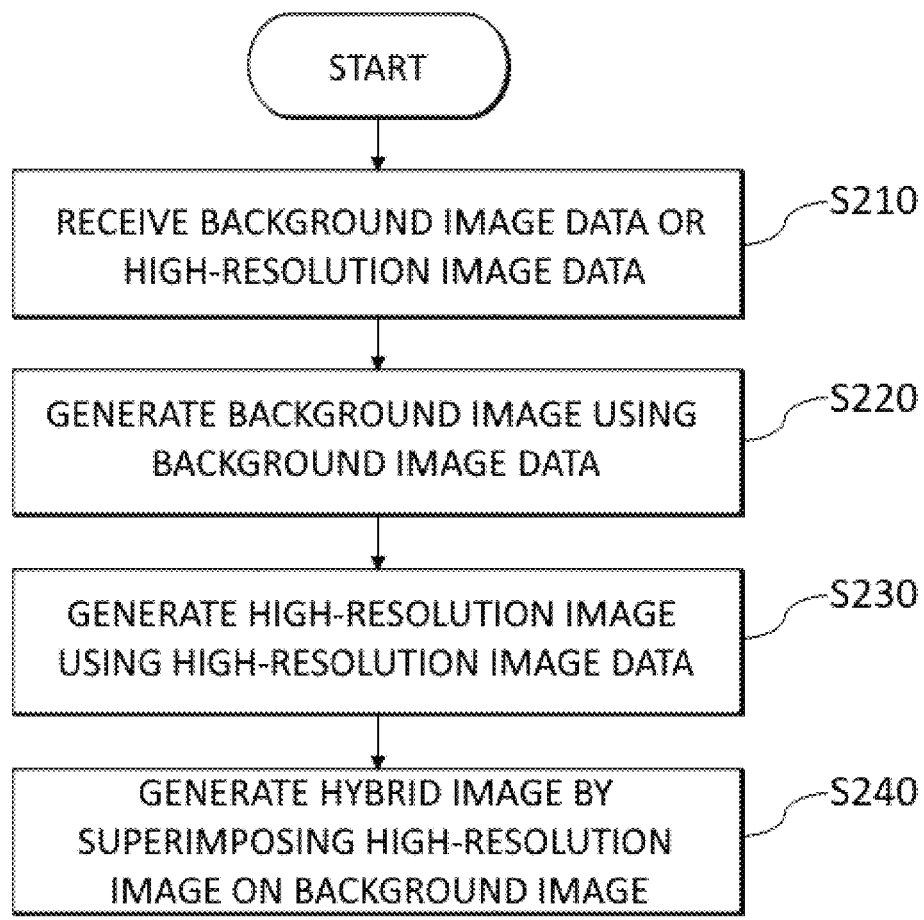
FIG. 4 is a flowchart of a method of generating a hybrid-resolution image according to an embodiment of the present invention.

FIG. 4 is a flowchart of a method of generating a hybrid-resolution image according to an embodiment of the present invention.

FIG. 5 illustrates reference diagrams of image data processed according to an embodiment of the present invention.

Referring to FIG. 4, first, in operation S210, the reception-side processor 220 may receive image data (or high-resolution image data) having a first resolution or background image data having a second resolution lower than the first resolution. Since the high-resolution image data and the background image data are described with reference to FIGS. 2 and 3, the description thereof will not be repeated.

Figure 5A:
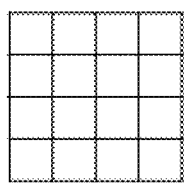
Figures 1, 5A:
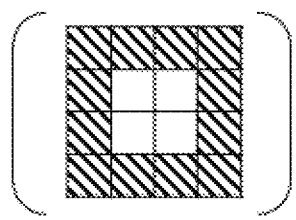
Figure 5B:
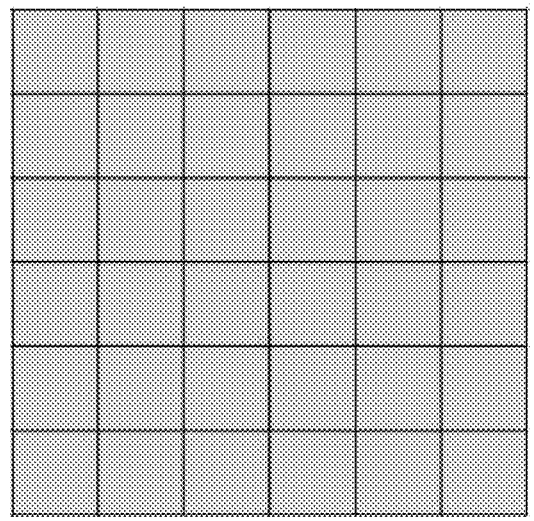

Referring to FIGS. 5A and 5B, the received high-resolution image data and background image data are illustrated.

Referring to FIG. 4 again, in operation S220, the reception-side processor 220 may generate a background image data having the first resolution using the background image. The background image data is an image having the second resolution lower than the first resolution. Therefore, in order to generate a background image having a higher resolution using the background image data, the reception-side processor 220 may generate a background image by repeatedly using data for each pixel included in the background image data to correspond to the number of pixels corresponding to the first resolution.

Figure 5C:
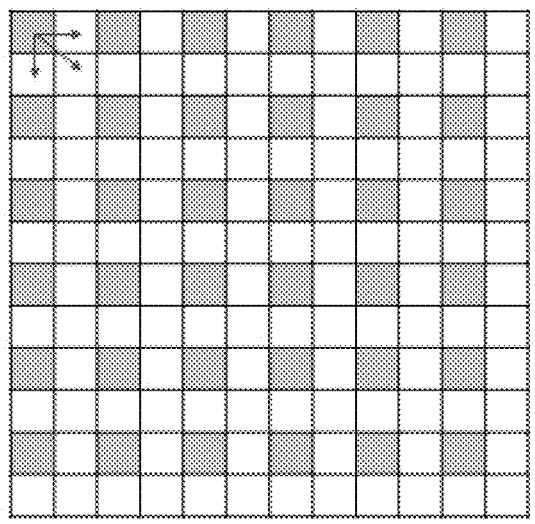

Referring to FIGS. 5B and 5C, reference diagrams illustrating background images generated using the background image data are illustrated. The received background image data is image data having a resolution of 6×6. This is an example of repeatedly using data for each pixel (shaded region) so as to fill four pixels in order to generate a background image having a resolution of 12×12. Although the example in which the data is simply and repeatedly used is used in this specification, it is obvious that various methods known to those skilled in the art may be applied as a method of generating an image having a high resolution from image data having a low resolution.

Referring to FIG. 4 again, in operation S230, the reception-side processor 220 may generate a high-resolution image having the first resolution using the high-resolution image data. Since the high-resolution image data is image data having the first resolution, the method of generating the image having the first resolution will not be described in detail.

Next, in operation S240, the reception-side processor 220 may generate a hybrid image by superimposing the high-resolution image on the background image.

Figure 5D:
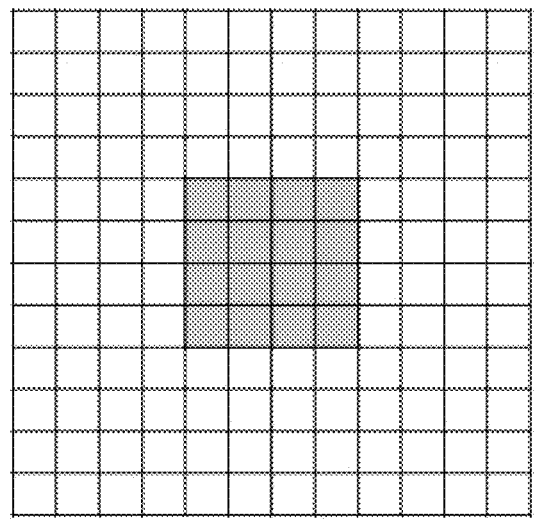

Referring to FIG. 5D, it can be seen that the hybrid image is generated by superimposing the high-resolution image (central shaded region) on the background image.

When the image data is transmitted in real time using the method of transmitting the hybrid-resolution image data and the method of generating the hybrid-resolution image according to the present invention, it is possible to provide a video streaming service that uses fewer communication resources and does not impair the user's convenience compared to the conventional method of transmitting original image data. Although the first resolution and the second resolution may be set in various ways, the first resolution may be set to a relatively high resolution so as not to harm the user's convenience, and the second resolution may be set to a relatively low resolution so as to use as few communication resources as possible.

Meanwhile, when a difference in resolution between the first resolution and the second resolution is large, there is a high possibility that the user may feel the sense of difference of the image at a boundary in the hybrid image in which the background image and the high-resolution image are superimposed. Therefore, it is necessary to naturally process the boundary in which the images are superimposed.

According to an embodiment of the present invention, in operation S120 of the method of transmitting the hybrid-resolution image data, the transmission-side processor 120 may further set a buffer region having a preset size from the boundary of the high-resolution display region. In addition, in operation S130, the transmission-side processor 120 may change the buffer region to a buffer region having the first resolution and further add a blur effect to the changed buffer region.

Referring to FIG. 3 again, it can be seen that the buffer region (shaded region) is set at the boundary of the high-resolution display region in FIG. 3C-1. The buffer region is a region forming a boundary with the background image when the hybrid image is generated. An effect of the boundary being naturally connected in the hybrid image generated by applying the blur effect to the buffer region may be obtained.

In this case, the reception-side processor 220 may receive the high-resolution image data to which the blur effect has already been applied, and the reception-side processor 220 may generate a hybrid image by superimposing the high-resolution image on the background image without additional processing.

According to another embodiment of the present invention, in operation S230 of the method of generating the hybrid-resolution image, the reception-side processor 220 may set the buffer region having a preset size from the boundary of the high-resolution display region. In this case, the transmission-side processor 120 does not perform a separate process related to the buffer region on the high-resolution image data. In this case, the reception-side processor 220 may add the blur effect to the buffer region in operation S230. Thereafter, an effect of the boundary between the background image and the high-resolution image being naturally connected may be obtained in the generated hybrid image.

Meanwhile, in FIGS. 2 to 5, when the high-resolution image is superimposed on the background image, description will be made assuming that a location where the high-resolution image is superimposed on the background image is known. However, although the transmission-side terminal needs to provide the information related to the high-resolution display region to the reception-side terminal, the reception-side terminal may place the high-resolution image at an accurate location in the background image. Hereinafter, content related to the location of the high-resolution image will be described.

FIG. 6 illustrates exemplary diagrams of a structure of image data.

According to an embodiment of the present invention, in operation S150 of the method of transmitting the hybrid-resolution image data, the transmission-side processor 120 may further transmit the location information of the high-resolution display region. In this case, in operation S210 of the method of generating the hybrid-resolution image, the reception-side processor 220 may further receive the location information of the high-resolution display region, which is information about the location where the high-resolution image is superimposed on the background image.

Figure 6A:
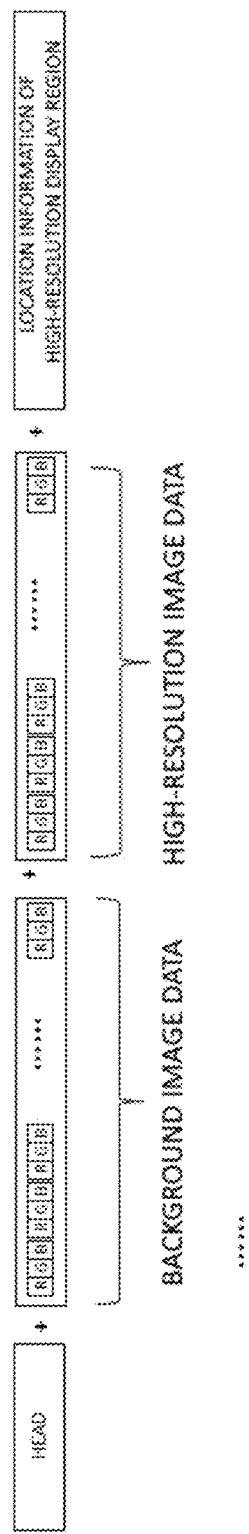
FIGS. 6A and 6B illustrate exemplary diagrams of a structure of image data.

Referring to FIG. 6A, it can be seen that an image data packet includes a "HEAD" field, "background image data," "high-resolution image data," and "location information of a high-resolution display region."

According to another embodiment of the present invention, in operation S140 of the method of transmitting the hybrid-resolution image data, the transmission-side processor 120 may fill the image data corresponding to the high-resolution display region in the background image data with preset display data and convert the image data.

Figure 6B:
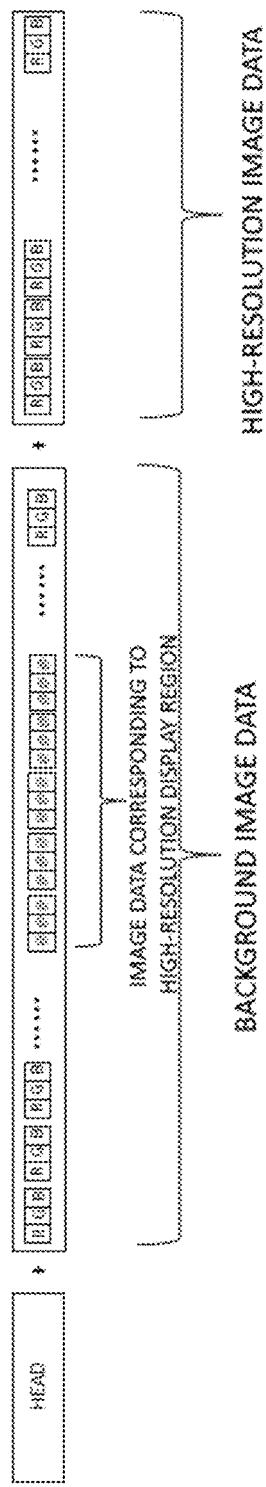

Referring to FIG. 6B, it can be seen that a specific section in the background image data is displayed as the "image data corresponding to the high-resolution display region." Generally, the image data is filled with data related to a red-green-blue (RGB) gradation value included in each pixel. However, according to another embodiment of the present invention, the "image data corresponding to the high-resolution display region" in the background image data may be filled with another display data (displayed as "A" in FIG. 6) instead of the gradation value. The display data has a value that the grayscale value cannot have and has a value previously agreed on between the transmission-side processor 120 and the reception-side processor 220.

Therefore, in operation S150, the transmission-side processor 120 may transmit the background image data, in which the image data corresponding to the high-resolution display region in the background image data is filled with the preset display data, and the high-resolution image data. In this case, the background image data received in operation S210 of the method of generating the hybrid-resolution image is background image data, in which image data corresponding to the high-resolution display region where the high-resolution image in the background image data is superimposed on the background image, is filled with the preset display data. Thereafter, the reception-side processor 220 may generate a hybrid image by superimposing the high-resolution image on the location of the background image data filled with the preset display data in operation S240.

Meanwhile, in consideration of a usage environment of the video conference system according to the present invention, the camera may be installed in a fixed place and not moved. In this case, a face of a person who is a conference participant in the screen may be changed through movement, but the background image may barely change. In this case, there may be no difference between the background image data that is previously transmitted and the background image data to be transmitted at the current time.

In the method of transmitting the hybrid-resolution image data according to the present invention, in operation S150, the transmission-side processor 120 may determine whether the background image data that is previously transmitted is identical to the background image data to be transmitted. When it is determined that the background image data that is previously transmitted is identical to the background image data to be transmitted, the transmission-side processor 120 may transmit only the high-resolution image data and may not transmit the background image data. When the transmission-side processor 120 further transmits the location information of the high-resolution display region as in the embodiment of FIG. 6A, the transmission-side processor 120 may further transmit the location information of the high-resolution display region. In this case, the operation S210 of the method of generating the hybrid-resolution image according to the present invention is an operation of receiving only the high-resolution image data, and the operation S220 is an operation of replacing the background image with a background image generated using the background image data previously received.

On the other hand, the transmission-side processor 120 may transmit both of the high-resolution image data and the background image data, and the reception-side processor 220 may determine whether the background image data is the same. In this case, in the operation S220 of the method of generating the hybrid-resolution image according to the present invention, the reception-side processor 220 may determine whether the background image data previously received is identical to the background image data currently received. In addition, when it is determined that the background image data that is previously transmitted is identical to the background image data to be transmitted, the reception-side processor 220 may replace the background image with a background image generated using the background image data previously received.

Meanwhile, a delay may occur due to a difference in network environment between the image data transmitting side and the image data reception side. When an Internet delay (temporary decrease in data transmission speed) has occurred during the video conference, there is a case in which the delay has not occurred bidirectionally and has occurred unidirectionally. For convenience of description, a situation where a participant A and a participant B participate in the video conference is exemplified. The participant A thinks that the participant B is still stationary because the participant B moving on a monitor looks normal or because the participant B was originally stationary, and thus the participant A may mistakenly believe that the network is operating normally without any delays. That is, when the participant A does not recognize that a transmission delay in a direction of A-*B occurs and continues to say what he or she wants to say to the participant B, the movement and speech of the participant A may be interrupted on the monitor and speaker of the participant B. In this case, a system A needs to reduce a range of the high-resolution region or lower the resolution of the high-resolution area to have a low resolution for an image of the system A side automatically transmitted to a system B. In the same way, the system B also needs to reduce a range of the high-resolution region or lower the resolution of the high-resolution area to have a low resolution for an image of the system B side automatically transmitted to the system A.

To this end, in the method of transmitting the hybrid-resolution image data according to the present invention, when a network delay phenomenon occurs, the processor may reduce the high-resolution display region or convert the high-resolution display region to a high-resolution display region having the second resolution.

Meanwhile, whether the network delay phenomenon occurs may be determined in various ways. According to an embodiment of the present invention, the image data receiving side may transmit an acknowledge signal to the image data transmitting side in a preset period. In addition, the image data transmitting side may determine that the network delay phenomenon occurs when an interval between acknowledge signals that should be received in each preset period is longer than the preset period. For example, the system A transmits a periodic signal (e.g., transmits an OK signal every one second) to the system B. The system B needs to receive the OK signal every one second to confirm that the transmission in the direction of A→B is normal. When the system B does not receive the OK signal, the system B may inform the system A that the transmission in the direction of A→B is abnormal. A warning message is displayed on a monitor of the system A stating that the system B does not receive information from the system A. The system A may stop narration and may resume the narration when the network returns to normal.

As described above, in the case in which the OK signal is received every one second, when the network returns to normal, the OK signals that have not received and accumulated come in at once. In order to solve the above problem, a time tag may be added to the OK signal. It is possible to know the time when the OK signal is transmitted from the system A and the time when the OK signal is arrived at the system B. It is possible to know the time when the OK signal is transmitted from the system B and the time when the OK signal is arrived at the system A.

As another method, there is a method of utilizing fourth generation (4G) and fifth generation (5G) networks used by smartphones. When a video conference program is used in a computer, smartphones are linked and utilized. Audio information may be transmitted or received through the smartphones, and image information may be transmitted or received through the Internet. In this case, a problem of synchronization of the audio information and the image information may occur. This is because, in general, image information on the Internet arrives a little later than audio information on a phone. Recall that there is only an app (application) in charge of a phone function in the smartphone, and the smartphone itself is not a phone, and the following description will be continued. A video conference app is installed in the smartphone. When the video conference program is executed on the computer, the video conference program may be synchronized to activate the video conference app installed on the smartphone or vice versa.

The sound generated by the phone app is muted, and the video conference app stores the muted sound in a buffer and plays the sound back to the user with a delay. A method of synchronizing, that is, determining how much time delay should be applied, is a method of matching a microphone installed in the smartphone while listening to the sound generated by the computer. Here, it should be noted that when the sound is played simultaneously on the smartphone and the computer, an echo boom phenomenon may occur, which may generate a loud noise. In order to prevent the above problem, it is important to automatically adjust the volume so that only one side of the sound comes out, and it is also important to continuously synchronize the sound even though a sound is not produced. When there is a delay in the Internet network, the computer will lose sound. In this case, the sound is played back on the smartphone. In this way, even when video information is not transmitted due to the network delay, audio information is transmitted, enabling smoother video conference.

A boundary between a high-resolution region and a low-resolution region may have a square or rectangular shape or may have a circular or elliptical shape. Since the shape of the boundary is artificial, an unnaturalness of the image is made. In order to overcome the above, the boundary is defined to follow a shape of a subject present in the high-resolution region, and thus the unnaturalness may be eliminated. For example, when it is assumed that the subject is a person and an upper body of the subject appears in the image, the subject may be set as the high-resolution region. When the shape of the boundary is a rectangular shape, the sense of difference causes unnaturalness over the boundary. In this case, when the boundary is set according to the shape of the subject or when the boundary is set similarly to the shape of the subject but the boundary is set with a larger area than the subject, the unnaturalness resulting from the sense of difference may be eliminated.

By observing the user's gaze, it is possible to identify a subject on the screen that the user is looking at. The user's gaze may be observed through the camera. Based on the above information, it is possible to use an algorithm that processes a portion of the subject that the user focuses on as the high-resolution region.

The transmission-side processor and the reception-side processor may include microprocessors, application-specific integrated circuits (ASICs), other chipsets, logic circuits, registers, communication modems, data processing devices, and the like, which are known in the art for performing calculations and various control logic. Further, when the above-described control logic is implemented in software, the processor may be implemented as a set of program modules. In this case, the program modules may be stored in a memory device and may be executed by the processors.

The computer program may include code coded in a computer language such as C/C++, C#, JAVA, Python, or machine language that the processor (CPU) of the computer may read through a device interface of the computer in order for the computer to read the program and execute the methods implemented as a program. The code may include functional code related to a function defining functions necessary to execute the above methods and the like and include execution procedure related control code necessary for the processor of the computer to execute the functions according to a predetermined procedure. Further, the code may further include memory reference-related code for which additional information or media necessary for the processor of the computer to execute the functions should be referred to a location (address) of an internal or external memory of the computer. Further, when the processor of the computer needs to communicate with any other computer or server in a remote location in order to execute the functions, the code may further include communication-related code for how to communicate with any other remote computer or server using the communication module of the computer and what information or media to transmit or receive during communication.

The storage medium is not a medium that stores data for a short moment, such as a register, a cache, a memory, etc., but a medium that stores data semi-permanently and may be read by a device. Specifically, examples of the storage medium include a read only memory (ROM), a random access memory (RAM), a compact disc read only memory (CD-ROM), a magnetic tape, a floppy disk, an optical data storage device, and the like, but the present invention is not limited thereto. That is, the program may be stored in various recording media on various servers accessible by the computer or in various recording media on the computer of the user. Further, the media may be distributed to computer systems connected by a network, and computer-readable codes may be stored in a distributed manner.

According to an aspect of the present invention, it is possible to reduce an amount of data transmission by transmitting image data so that a main region in an image is transmitted at a high resolution while the remaining regions are transmitted at a low resolution as a background image.

According to another aspect of the present invention, in spite of a background image having a low resolution, a main region of an image, which is expressed at a high resolution, can be generated, and thus the user's convenience is inhibited.

According to still another aspect of the present invention, independent of a program that utilizes image information, such as a video conference program, etc., a user can select to use an image having a hybrid resolution.

Effects of the present invention are not limited to the above-described effects and other effects which have not been described may be clearly understood by those skilled in the art from the above descriptions.

While the embodiments of the present inventive concept have been described with reference to the accompanying drawings, it will be understood by those skilled in the art that various modifications can be made without departing from the scope of the present inventive concept and without changing essential features. Therefore, the above-described embodiments should be considered in a descriptive sense only and not for purposes of limitation.

What is claimed is:

1. A method of transmitting hybrid-resolution image data, the method comprising:
  an operation (a) of receiving, by a processor, data of an original image from an image information generating device;
  an operation (b) of setting, by the processor, a high-resolution display region in the original image;
  an operation (c) of converting, by the processor, image data in the high-resolution display region in the original image into high-resolution image data having a first resolution;
  an operation (d) of converting, by the processor, the data of the original image into background image data at a second resolution lower than the first resolution;
  an operation (e) of transmitting, by the processor, the high-resolution image data or the background image data;

an operation (f) of, when a network delay phenomenon occurs, reducing, by the processor, the high-resolution display region or converting the high-resolution display region into a high-resolution display region having the second resolution; and an operation (f1) of, in response to determining that there is sufficient capacity to transmit or receive a portion other than the high-resolution display region at a high resolution, automatically enlarging the high-resolution display region, and in response to determining that there is insufficient capacity, automatically reducing the high-resolution display region.

2. The method of claim 1, wherein the operation (b) includes setting a region set by a user input or an external terminal as the high-resolution display region.

3. The method of claim 2, wherein the operation (b) includes, when the high-resolution display region set by the user input and the high-resolution display region set by the external terminal conflict with each other, setting, by the processor, the region set by the external terminal as the high-resolution display region.

4. The method of claim 3, wherein the operation (b) includes adjusting, by the processor, a size of the high-resolution display region according to computational processing capability of a terminal or a state of a communication network.

5. The method of claim 1, wherein the operation (b) includes setting, by the processor, a face region in the original image as the high-resolution display region using a face recognition algorithm.

6. The method of claim 1, wherein the operation (b) includes further setting, by the processor, a buffer region having a preset size from a boundary of the high-resolution display region.

7. The method of claim 6, wherein the operation (c) includes changing, by the processor, the buffer region to a buffer region having the first resolution and further adding a blur effect to the changed buffer region.

8. The method of claim 1, wherein the operation (e) includes further transmitting, by the processor, location information of the high-resolution display region.

9. The method of claim 1, wherein:
the operation (d) includes filling, by the processor, image data in the background image data, which corresponds to the high-resolution display region, with preset display data and converting the image data; and
the operation (e) includes transmitting, by the processor, the background image data and the high-resolution image data.

10. The method of claim 1, wherein the operation (e) includes:
an operation (e-1) of determining, by the processor, whether the background image data to be transmitted is identical to background image data that is previously transmitted; and
an operation (e-2) of, when it is determined that the background image data that is previously transmitted is identical to the background image data to be transmitted, transmitting, by the processor, only the high-resolution image data.

11. The method of claim 8, wherein the operation (e-2) includes further transmitting, by the processor, the location information of the high-resolution display region.

12. The method of claim 1, wherein the operation (f) includes, when an interval between acknowledge signals to be received in each of preset periods is longer than a set period, determining, by the processor, that the network delay phenomenon occurs.

13. A computer program which is written in a computer to perform each operation of the method of transmitting the hybrid-resolution image data according to claim 1 and recorded on a computer-readable recording medium.

14. A method of generating a hybrid-resolution image, the method comprising:
an operation (a) of receiving, by a processor, high-resolution image data having a first resolution, or background image data having a second resolution lower than the first resolution;

an operation (b) of generating, by the processor, a background image having the first resolution using the background image data;

an operation (c) of generating, by the processor, a high-resolution image having the first resolution using the high-resolution image data;

an operation (d) of generating, by the processor, a hybrid image by superimposing the high-resolution image on the background image;

an operation (e) of, when a network delay phenomenon occurs, reducing, by the processor, a high-resolution display region or converting the high-resolution display region into a high-resolution display region having the second resolution; and an operation (f) of, in response to determining that there is sufficient capacity to transmit or receive a portion other than the high-resolution display region at a high resolution, automatically enlarging the high-resolution display region, and in response to determining that there is insufficient capacity, automatically reducing the high-resolution display region.

15. The method of claim 14, wherein the operation (b) includes generating the background image by repeatedly using data for each of pixels included in the background image data to correspond to a number of pixels corresponding to the first resolution.

16. The method of claim 14, wherein the operation (c) further includes setting, by the processor, a buffer region having a preset size from a boundary of the high-resolution display region.

17. The method of claim 16, wherein the operation (c) further includes adding, by the processor, a blur effect to the buffer region.

18. The method of claim 14, wherein the operation (a) includes further receiving, by the processor, location information of the high-resolution display region, which is information about a location in which the high-resolution image is superimposed on the background image.

19. The method of claim 14, wherein, in the background image data received in the operation (a), image data corresponding to the high-resolution display region, which corresponds to a location of the background image data in which the high-resolution image is superimposed on the background image, is filled with preset display data.

20. The method of claim 19, wherein the operation (d) includes generating, by the processor, the hybrid image by superimposing the high-resolution image at the location of the background image data filled with the preset display data.

21. The method of claim 14, wherein:
the operation (a) includes receiving only the high-resolution image data; and the operation (b) includes replacing the background image with a background image generated using background image data previously received.

22. The method of claim 14, wherein the operation (b) includes:
an operation (b-1) of determining, by the processor, whether the background image data currently received is identical to background image data that is previously received; and
an operation (b-2) of, when it is determined that background image data that is previously transmitted is identical to background image data to be transmitted, replacing, by the processor, the background image with a background image generated using the background image data previously received.

23. The method of claim 14, further comprising an operation (e) of transmitting, by the processor, an acknowledge signal to a device to which the image data is transmitted in each of preset periods.

24. A computer program which is written in a computer to perform each operation of the method of generating the hybrid-resolution image according to claim 14 and recorded on a computer-readable recording medium.

25. A hybrid-resolution image data transmission device comprising:
an image information generating device configured to output data of an original image;
a processor configured to generate background image data or high-resolution image data using the data of the original image; and
a communication unit configured to transmit the background image data or the high-resolution image data,
wherein the processor receives the data of the original image from the image information generating device,
sets a high-resolution display region in the original image,
converts the data of the original image into background image data at a second resolution lower than a first resolution capable of being variously set by a user without changing a size of a corresponding display region,
converts image data in the high-resolution display region in the original image into high-resolution image data having the first resolution, and
controls the communication unit to transmit the background image data or the high-resolution image data.

26. A hybrid-resolution image data transmission device comprising:
a camera configured to output data of an original image;
a processor configured to generate background image data or high-resolution image data using the data of the original image; and
a communication unit configured to transmit the background image data or the high-resolution image data,
wherein the processor receives the data of the original image from the camera,
sets a high-resolution display region in the original image set by a user input or an external terminal,
converts the data of the original image into the background image data at a second resolution lower than a first resolution,
converts image data in the high-resolution display region in the original image into high-resolution image data having the first resolution,
controls the communication unit to transmit the background image data or the high-resolution image data,
when a network delay phenomenon occurs, reduces the high-resolution display region or converts the high-resolution display region into a high-resolution display region having the second resolution, and
in response to determining that there is sufficient capacity to transmit or receive a portion other than the high-resolution display region at a high resolution, automatically enlarges the high-resolution display region, and in response to determining that there is insufficient capacity, automatically reduces the high-resolution display region.

27. A method of transmitting hybrid-resolution image data, the method comprising:
an operation (a) of receiving, by a processor, data of an original image from a camera;
an operation (b) of setting, by the processor, a high-resolution display region in the original image and further setting a buffer region having a preset size from a boundary of the high-resolution display region;
an operation (c) of converting, by the processor, image data in the high-resolution display region in the original image into high-resolution image data having a first resolution, converting the buffer region into a buffer region having the first resolution, and further adding a blur effect to the converted buffer region;
an operation (d) of converting, by the processor, the data of the original image into the background image data at a second resolution lower than the first resolution;
an operation (e) of transmitting, by the processor, the high-resolution image data or the background image data;
an operation (f) of, when a network delay phenomenon occurs, reducing, by the processor, the high-resolution display region or converting the high-resolution display region into a high-resolution display region having the second resolution; and
an operation (f1) of, in response to determining that there is sufficient capacity to transmit or receive a portion other than the high-resolution display region at a high resolution, automatically enlarging the high-resolution display region, and in response to determining that there is insufficient capacity, automatically reducing the high-resolution display region.

28. A hybrid-resolution image data transmission device comprising:
a camera configured to output data of an original image;
a processor configured to generate background image data or high-resolution image data using the data of the original image; and
a communication unit configured to transmit the background image data or the high-resolution image data,
wherein the processor receives the data of the original image from the camera,
sets a high-resolution display region in the original image,
sets a buffer region having a preset size from a boundary of the high-resolution display region,
converts the data of the original image into the background image data at a second resolution lower than a first resolution,
converts image data in the high-resolution display region in the original image into high-resolution image data having the first resolution,
converts the buffer region into a buffer region having the first resolution,
adds the blur effect to the converted buffer region,
controls the communication unit to transmit the background image data or the high-resolution image data,
when a network delay phenomenon occurs, reduces the high-resolution display region or converts the high-resolution display region into a high-resolution display region having the second resolution, and in response to determining that there is sufficient capacity to transmit or receive a portion other than the high-resolution display region at a high resolution, automatically enlarges the high-resolution display region, and in response to determining that there is insufficient capacity, automatically reduces the high-resolution display region.

29. A hybrid-resolution image generating device comprising:

a communication unit configured to receive high-resolution image data having a first resolution, or background image data having a second resolution lower than the first resolution;

a processor configured to generate a hybrid image using the high-resolution image data and the background image data; and a display configured to output the hybrid image, wherein the processor receives the high-resolution image data or the background image data from the communication unit, generates a background image using the background image data, generates a high-resolution image using the high-resolution image data, generates a hybrid image by superimposing the high-resolution image on the background image, when a network delay phenomenon occurs, reduces a high-resolution display region or converts the high-resolution display region into a high-resolution display region having the second resolution, and in response to determining that there is sufficient capacity to transmit or receive a portion other than the high-resolution display region at a high resolution, automatically enlarges the high-resolution display region, and in response to determining that there is insufficient capacity, automatically reduces the high-resolution display region.

* * * * *